US008479392B2

(12) United States Patent
Wepfer

(10) Patent No.: US 8,479,392 B2
(45) Date of Patent: Jul. 9, 2013

(54) ANTI-VIBRATION BAR CLAMPING TOOL AND METHOD

(75) Inventor: Robert M. Wepfer, Export, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 39 days.

(21) Appl. No.: 13/151,621

(22) Filed: Jun. 2, 2011

(65) Prior Publication Data

US 2012/0304466 A1 Dec. 6, 2012

(51) Int. Cl.
*B23P 15/26* (2006.01)
*F22B 37/24* (2006.01)
*F28D 7/00* (2006.01)

(52) U.S. Cl.
USPC .. 29/890.053; 29/726.5; 29/727; 29/890.054; 122/510; 165/162

(58) Field of Classification Search
USPC ................. 29/890.053, 890.054, 700, 726.5, 29/727; 122/510; 165/69, 162; 254/12, 122; 376/302
See application file for complete search history.

(56) References Cited

U.S. PATENT DOCUMENTS

| | | | |
|---|---|---|---|
| 3,575,236 A * | 4/1971 | Romanos | 165/162 |
| 4,262,402 A * | 4/1981 | Cooper et al. | 29/890.121 |
| 4,680,975 A | 7/1987 | Dodt | |
| 4,713,882 A * | 12/1987 | Bianchi et al. | 29/727 |
| 4,718,479 A * | 1/1988 | Lagally et al. | 165/69 |
| 4,789,028 A * | 12/1988 | Gowda et al. | 165/162 |
| 4,874,041 A | 10/1989 | Crick et al. | |
| 4,893,671 A * | 1/1990 | Lagally et al. | 165/162 |
| 4,991,645 A * | 2/1991 | Lagally et al. | 165/69 |
| 5,127,469 A | 7/1992 | Boula | |
| 5,172,586 A | 12/1992 | Reed | |
| 5,515,911 A * | 5/1996 | Boula et al. | 165/69 |
| 6,645,417 B1 | 11/2003 | Grove | |
| 2005/0166413 A1 | 8/2005 | Crampton | |
| 2009/0020273 A1 * | 1/2009 | Schneider et al. | 165/162 |
| 2009/0104299 A1 | 4/2009 | McCracken et al. | |

* cited by examiner

*Primary Examiner* — Alexander P Taousakis

(57) ABSTRACT

An automated tool and method for spacing a gap between the anti-vibration bars and the flow tubing in the bend region of a tube bundle of a U-tube steam generator, prior to welding, during manufacture. The tool comprises two toggle clamp elements attached to a scissors assembly, which are actuated by a linear drive motor in line with a force gauge, and coupled to a distance measuring device. The tool is operated by first attaching the toggle clamps respectively to two adjacent anti-vibration bars. A linear drive motor on the tool is then cycled and readouts of force and distance are plotted on a curve to determine the point of contact between the anti-vibration bar and the tube. The computer then automatically cycles the drive motor to adjust the gap to a desired range of position coordinates adjacent the point at which the curve markedly changes slope.

12 Claims, 5 Drawing Sheets

ANTI-VIBRATION BAR CLAMPING TOOL AND METHOD

BACKGROUND

1. Field

This invention relates in general to heat exchangers and to apparatus for preventing vibration within the tube bend region of a U-tube heat exchanger and more particularly to apparatus and methods for the spacing of anti-vibration bars in the tube lanes between tube columns in the U-bend region of such heat exchangers.

2. Related Art

U-shaped heat exchangers are commonly employed in pressurized water nuclear reactor steam generators. A nuclear steam generator generally comprises a vertically oriented shell, a plurality of U-shaped tubes disposed in the shell so as to form a tube bundle, a tube sheet for supporting the tubes at the ends opposite the U-like curvature, a dividing plate that cooperates with the tube sheet and a hemispheric channel head to form a primary fluid inlet header at one end of the tube bundle and a primary fluid outlet header at the other end of the tube bundle. A primary fluid inlet nozzle is in fluid communication with the primary fluid inlet header and a primary fluid outlet nozzle is in fluid communication with the primary fluid outlet header. The steam generator secondary side comprises a wrapper disposed between the tube bundle and the shell to form an annular chamber made up of the shell on the outside and the wrapper on the inside, and a feedwater ring disposed above the U-like curvature end of the tube bundle.

The primary fluid having been heated by circulation through the reactor core enters the steam generator through the primary fluid inlet nozzle. From the primary fluid inlet nozzle, the primary fluid is conducted through the primary fluid inlet header, through the inside of the U-tube bundle, out the primary fluid outlet header, through the primary fluid outlet nozzle to the remainder of the reactor coolant system. At the same time, feedwater is introduced to the steam generator secondary side through a feedwater nozzle which is connected to the feedwater ring inside the steam generator. Upon entering the steam generator, the feedwater mixes with water returning from moisture separators positioned above the U-tube bundle, referred to as the recirculation stream. This mixture, called the downcomer flow, is conducted down the annular chamber adjacent to the shell between the shell and the wrapper until the tube sheet near the bottom of the annular chamber causes the water to reverse direction, passing in heat exchange relationship with the outside of the U-tubes and up through the inside of the wrapper. While the water is circulating in heat exchange relationship with the tube bundle, heat is transferred from the primary fluid in the tubes to the water surrounding the tubes, causing a portion of the water outside the tubes to be converted to steam. The steam then rises and is conducted through a number of moisture separators that separate any entrained water from the steam, and the steam vapor then exits the steam generator and is circulated typically through electrical generating equipment to generate electricity in a manner well known in the art.

The portion of the steam generator primarily including the bundle of U-shaped tubes and the channel head is typically referred to as the evaporator section. The portion of the steam generator above the U-shaped tubes that includes the moisture separators is typically referred to as the steam drum. Feedwater enters the steam generator through an inlet nozzle which is disposed in the upper portion of the cylindrical shell. The feedwater is distributed and mixed with water removed by the moisture separation and then flows down the annular channel surrounding the tube bundle.

The U-tubes are supported at their open ends by conventional means whereby the ends of the tubes are seal welded to the tube sheet which is disposed transverse to the longitudinal access of the steam generator. A series of tube support plates arranged in an axial spaced relationship to each other are provided along the straight portion of the tubes in order to support the straight section of the tubing. An upper tube support assembly is utilized to support the U-shaped portion of the tubes of the tube bundle. The upper assembly comprises a plurality of retaining rings arranged around the outside of the tube bundle in spaced relationship to each other.

The retaining rings, like the tube support plates, are arranged substantially transverse to the longitudinal access of the steam generator. Each retaining ring is generally an oval shape which coincides with the outer periphery of the tube bundle at the particular location of the retaining ring. Thus, the size of the oval of the retaining rings decreases with the distances toward the upper end of the tube bundle. The uppermost retaining ring, therefore, is relatively small inasmuch as it is located at the uppermost portion of the tube bundle where the shape of the tube bundle is rapidly converging.

Each of the retaining rings is connected to a plurality of anti-vibration bars which are typically disposed between each column of the U-shaped portion of the tubes. In some steam generators, the anti-vibration bars comprise a bar bent into a V-shaped configuration such that two legs are formed with an angle therebetween. The V-shaped bars are inserted between successive columns of steam generator flow tubes. The V ends of the bars are inserted between the flow tubes; the free ends of the bars are welded to opposite sides of the appropriate retaining ring. In this manner, each of the tubes of the tube bundle is supported along the length of the curved or U-shaped portion at a number of spaced locations by an anti-vibration bar. This arrangement provides line support and yet allows the feedwater to flow around and between the curved portion of the steam generator tubes. In other words, the anti-vibration bars provide support and do not substantially interfere with the flow of the recirculation water.

The anti-vibration bars are intended to prevent successive vibrations of the individual tubes of the entire tube bundle. The vibrations in question are caused by the flow of water and steam past the flow tubes. These flow-induced vibrations can potentially damage the flow tubes. It is well known that the U-shaped portion of the tube bundle is more severely affected by the vibrations, and, because of the U-bend configuration, more difficult to adequately support in order to eliminate the vibrations. While the advent of the anti-vibration bars has materially reduced the magnitude and presence of vibrations, they have not in all cases completely eliminated damage which is caused by vibrations.

The mechanical aspects of the curvature of the U-bend portion of the tubes of the tube bundle are major obstacles to finding a mechanical solution to this problem. The U-shaped tubes of the tube bundle have dimensional tolerances associated with their outer diameter. There are also variations caused by ovalization of the tubes as a result of the bending. Furthermore, the spatial relationship between adjacent tubes is a variable, albeit, within design limits. Thus, there is a dimensional tolerance associated with the nominal spacing between the steam generator tubes. There is a dimensional tolerance associated with the outer dimensions of the anti-vibration bars. The combination of these tolerance and dimensional variances prevent the elimination of undesirable gaps between the vibration bars and the tubes of the steam generator. Any large gaps are undesirable because they allow vibration of the tubes and relative motion between the tubes and the anti-vibration bars. The relative motion can cause wear and subsequent damage or failure of the tubes. Therefore, it is important to control the spacing between the tubes and the anti-vibration bars for vibration control purposes and additionally to limit the pressure that the anti-vibration bars exert upon the tubes in that too much pressure can damage the tubes. Accordingly, it is an object of this invention to provide means to control the spacing between the anti-vibration bars and the tubes before the vibration bars are welded at their ends to the retaining rings during manufacture of the steam generator.

It is a further object of this invention to automate the process of spacing the anti-vibration bars from the tubes in the tube lanes of a tube column before the anti-vibration bars are welded at their ends to a corresponding retaining ring.

It is an additional object of this invention to establish a consistent spacing between the flow tubes and the adjacent anti-vibration bars.

Another object of this invention is to provide means for creating a record of the as built spacing of the vibration bars from the flow tubes after vibration bar ends have been welded to the corresponding retaining rings.

SUMMARY

This foregoing objects are achieved by the method described hereafter of installing anti-vibration bars in the U-shaped bend of a tube bundle of a U-tube heat exchanger, wherein the tube bundle has a plurality of rows of tubes, arranged in columns, with tube lanes therebetween. The method comprises the step of connecting two clamps that are hinged together at a scissor joint, respectively to two adjacent anti-vibration bars positioned respectively in the U-bend, in the tube lanes of two adjacent columns of tubes of the tube bundle; the clamps each having an actuation arm upstream of the scissor joint, with the clamps, actuation arms and scissor joint forming a scissor assembly. The method also includes the step of operating a linear drive motor which is connected to the scissor assembly to adjust the distance between the clamps, and thus the distance between the two adjacent anti-vibration bars to alter the spacing between the anti-vibration bars and the column of tubes between the two adjacent anti-vibration bars. The end portions of anti-vibration bars are then welded to a corresponding retaining ring encircling a periphery of a curved portion of the U-shaped bend of the tube bundle.

In one preferred embodiment, the method includes the step of controlling the force exerted by the linear driver motor on the two adjacent anti-vibration bars with a computer. Preferably, the computer records the spacing between the anti-vibration bars and the column of tubing therebetween prior to welding, by column and anti-vibration bar number. Most preferably, the computer also records the spacing between the anti-vibration bars and the column of tubing after welding, by column and anti-vibration bar number. Desirably, the linear drive motor includes a displacement sensor and a force measuring device and preferably the displacement sensor measuring device is a linear variable differential transformer and the force measuring device is a load cell. In another embodiment, the method includes the step of cycling the linear drive motor and outputs of force and distance are read into the computer to determine the slope of a force/distance curve. The outputs enable the computer to determine a point of contact between the anti-vibration bars and the tubes therebetween. After determining the point of contact, the computer may then cycle the linear drive motor to adjust the gap between the anti-vibration bars and the tubes to a preselected gap prior to welding of the anti-vibration bars to the retaining ring. After welding and cooling of the anti-vibration bars, the linear drive motor may then be cycled to determine the final gap between the adjacent anti-vibration bars by determining the position at which no load occurs in the scissor assembly. Preferably, the clamps are each toggle clamps.

The embodiments hereinafter provided also contemplate a device for applying a load to an anti-vibration bar in a tube lane in the U-shaped bend of a tube bundle of a U-tube heat exchanger to position the anti-vibration bar at a preselected distance from an adjacent column of tubes in the tube bundle before the anti-vibration bar is welded to a retaining ring encircling the outside of a portion of the tube bundle. The device comprises two clamps that are hinged together at a scissor joint, with each clamp having an actuation arm upstream of the scissor joint, with the clamps, actuation arms and scissor joint forming a scissor assembly. The device further includes a linear driver motor connected to the scissor assembly and operable to adjust the distance between the two clamps. The device further includes a displacement measuring device for measuring the displacement of a linear drive motor and thus the change in distance between the two clamps. Preferably, the clamps are toggle clamps and the linear driver motor is controlled by a computer. In addition, the device includes a displacement measurement apparatus for measuring the displacement of a linear drive motor and thus the spacing between the two clamps. The device also preferably has a measuring device for measuring the force applied by the linear drive motor on the scissor assembly.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
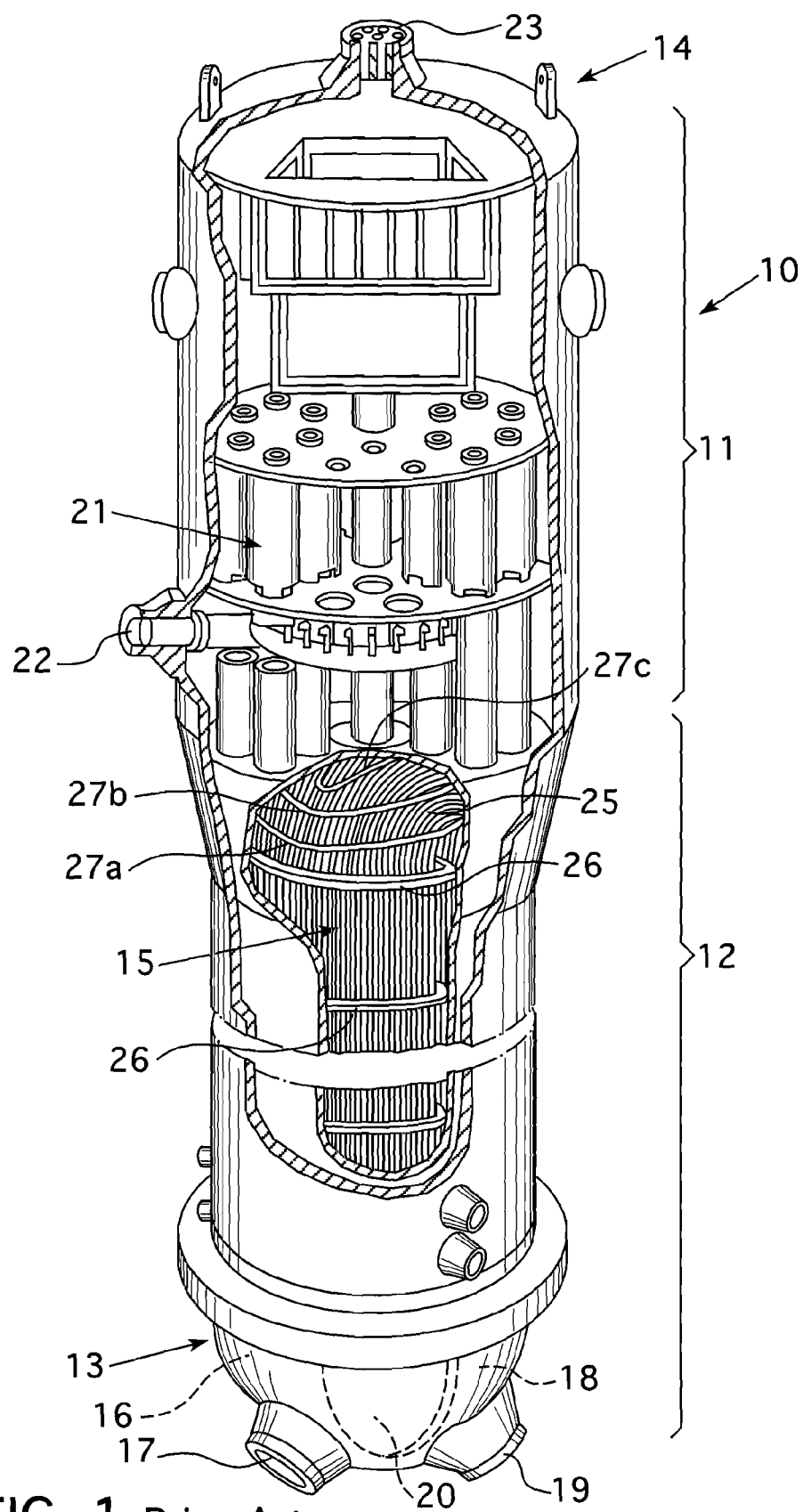
FIG. 1 is a perspective view, partially in cross section, of a nuclear steam generator having U-shaped bent tubes to which the method and apparatus of this embodiment may be applied.
Figure 2:
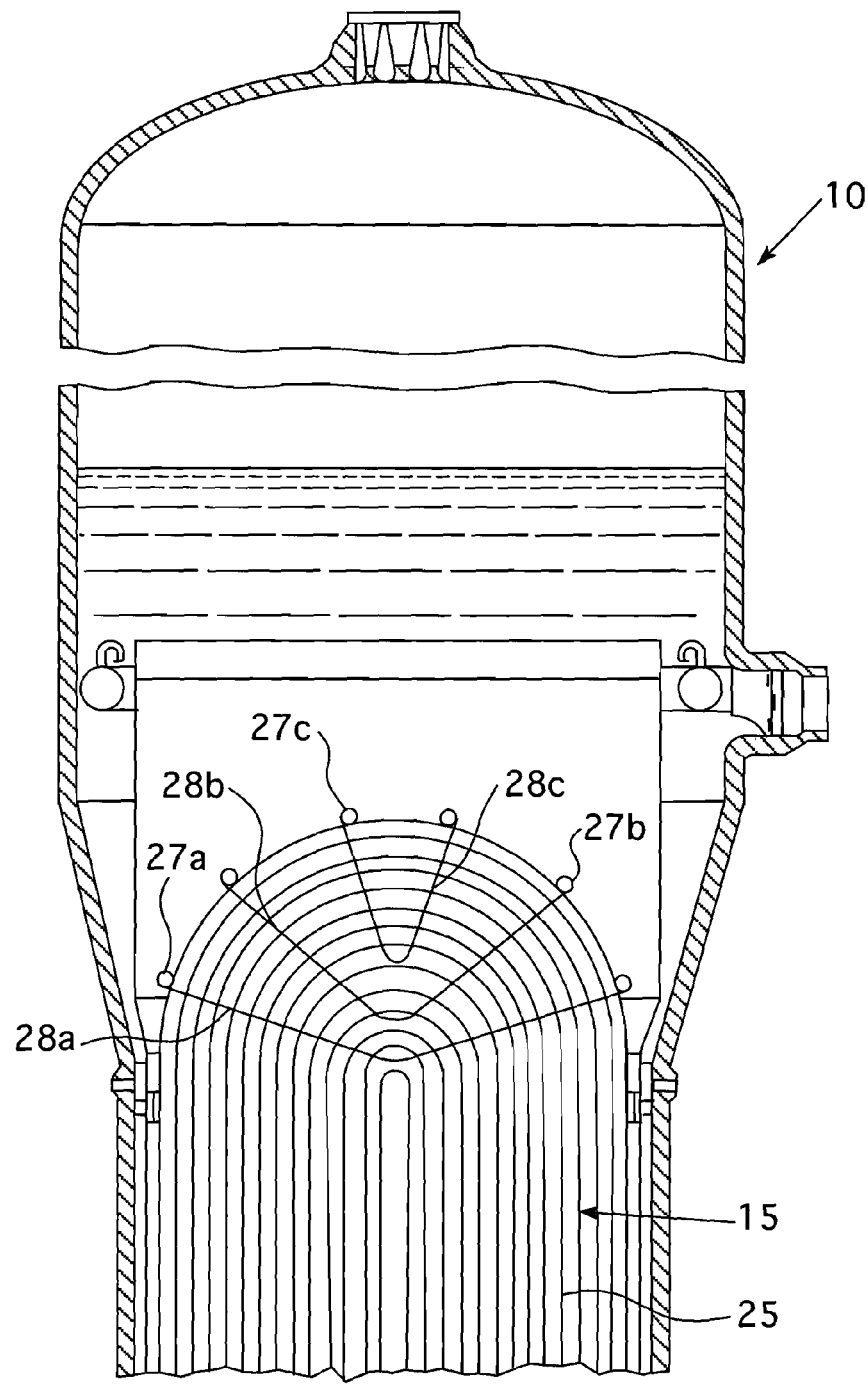
FIG. 2 is a schematic rendering of an axial section of the upper portion of the steam generator of FIG. 1, particularly illustrating the bent portion of the flow tubes and a typical installation position of the anti-vibration bars commonly employed in such generators.

Referring now to the drawings where like features are referred to by the same reference numbers among the various figures and, in particular, to FIGS. 1 and 2 which depict a typical steam generator to which the present embodiment may be applied.

The nuclear steam generator 10 comprises a substantially cylindrical shell having an upper section 11 and lower section 12. A hemispherical head or channel head 13 is sealingly attached at the lower end of the lower portion 12. An upper head 14 is sealingly attached to the upper end of the upper portion 11. A bundle 15 of U-shaped tubes is disposed within the lower portion 12. One end of the tube bundle 15 is in flow communication with the hot leg 16 of the channel head 13 and a primary coolant flow inlet nozzle 17. The other open end of the tube bundle 15 is in flow communication with the cold leg 18 of the channel head 13 and a primary coolant flow outlet nozzle 19. A partition 20 divides the hot leg 16 and cold leg 18 of the channel head 13. Thus, hot reactor coolant flows into the steam generator 10 and through inlet nozzle 17, through hot leg 16 into the tube bundle 15 and through and out of the tube bundle 15. The now cooled reactor coolant then flows through cold leg 18 and out the outlet nozzle 19 back to the nuclear reactor to repeat the flow cycle.

That portion 12 of the steam generator 10 primarily including tube bundle 15 and the channel head 13 is referred to as the evaporator portion. The upper section 11 of the steam generator 10 is generally referred to as the steam drum portion which includes a moisture separator 21. Feedwater enters the steam generator 10 through an inlet nozzle 22 and mixes with water removed by the moisture separator 21. The feedwater and recirculation stream flow down the downcomer surrounding the tube bundle 15 and is introduced into tube bundle 15 at the bottom thereof adjacent the tube sheet in which the ends of the tube bundle are secured. The mixture of feedwater and recirculating water then flows up through the tube bundle 15 where it is heated to a boil by the water flowing within the tubes 25 of the tube bundle 15. The steam produced by the boiling mixture of feedwater and the water removed by the moisture separators 21 rises up into the steam drum portion 11 where the moisture separator 21 removes water entrained within the steam before the steam exits through a steam outlet nozzle 23. The steam then flows to a steam turbine (not shown) and subsequently back into the steam generator where the cycle is repeated.

The U-shaped tubes 25 are supported along their straight lengths in the configuration of the tube bundle 15 by a series of support plates 26. The bent or U-shaped portion of the tubes 25 are supported by an assembly comprising a series of retaining rings 27a, 27b and 27c. Each of the retaining rings is generally of round or oval configuration with 27c being smaller than 27b, and 27b progressively smaller than 27a. A plurality of sets of anti-vibration bars 28 is disposed between adjacent columns of the U-shaped tubes 25. One such set of anti-vibration bars is more clearly shown in FIG. 2, it being understood that successive sets of similar anti-vibration bars 28 are disposed behind and in front of the illustrated set. Each of the anti-vibration bars 28a, 28b and 28c is of a V-shaped configuration with differing included angles and with the ends thereof attached, such as by welding, to symmetrically opposite points of the respective retaining rings 27a, 27b, and 27c. FIG. 2 illustrates a cross-sectional schematic view taken through the tube bundle 15 showing that the anti-vibration bars 28a, 28b, and 28c are disposed to support the bent or U-shaped portion of the tubes 25, noting the row and column arrangement of the tubes 25.

As previously mentioned, the spacing of the anti-vibration bars 28a, 28b, and 28c from the adjacent tubes 25 during manufacture, before the anti-vibrations bars are welded to the corresponding retaining rings 27a, 27b, and 27c, is critical to accommodate manufacturing tolerances and variances, as previously noted, and thermal expansions experienced in transitioning from a cold condition to a steady state, hot operating environment. Too close of a spacing can place too much pressure on the tubes during operation which can damage the tubes and promote corrosion. Alternatively, too large of a gap between the anti-vibration bars and adjacent tubing can reduce the mitigation affect of the anti-vibration bars on vibration and damage the tubes as well. Therefore, it is desirable that the spacing between the anti-vibration bars 28 and the tubing 25 be as close to the design specifications as can be obtained and be consistently applied from column to column of the tube bundle 15.

Figure 3:
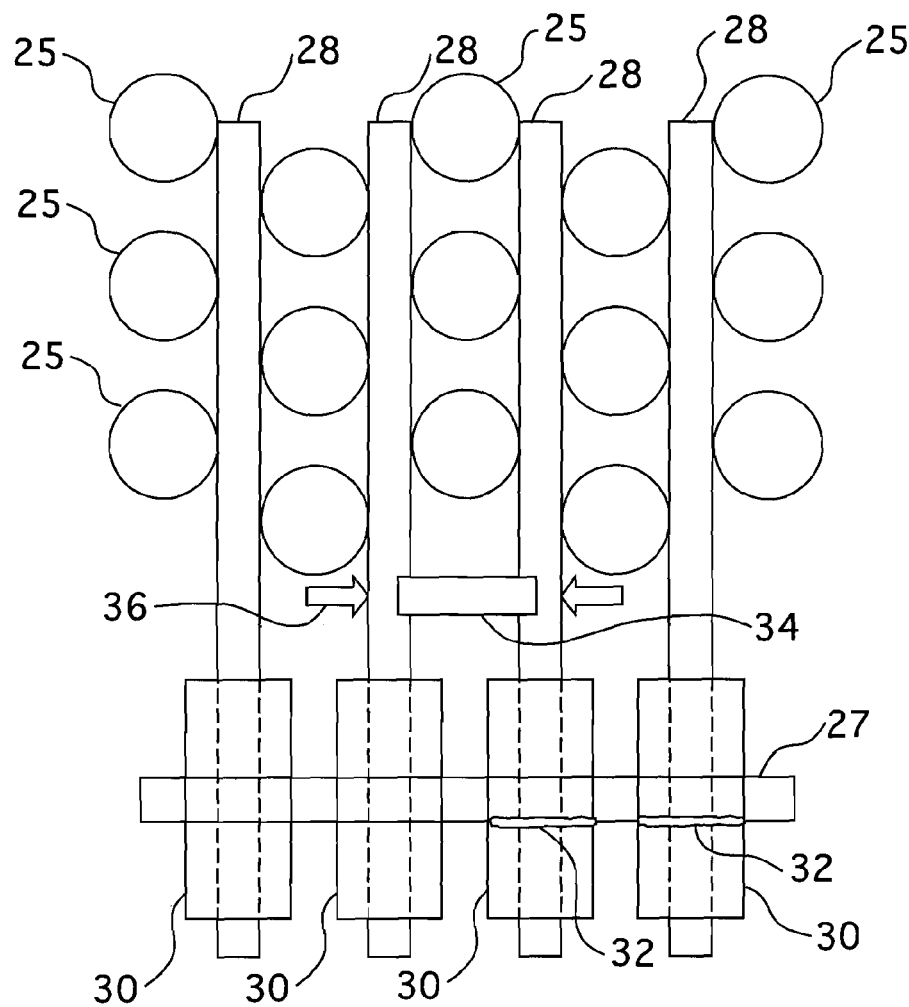
FIG. 3 is a schematic plan view of a conventional tube bundle taken at one level of the anti-vibration bars, which illustrates a conventional mechanism for positioning the anti-vibration bars relative to the columns of flow tubes.

Anti-vibration bar installation is performed at the manufacturing facility, and conventionally requires that anti-vibration bars be spaced manually. As shown in FIG. 3, the anti-vibration bars 28 are provided with end caps 30 that, in a fully constructed state, are welded, as shown at 32, to the retaining rings 27 to fix their proper spacing, relative to the adjacent column of flow tubes 25. Conventionally, to establish the proper spacing, spacer blocks or gauges 34 are inserted between the anti-vibrations bars that have already been welded and the adjacent bar that is to be welded. A clamping force 36 is typically applied perpendicular to the axis of the anti-vibration bars 28 to maintain the spacing defined by the spacer blocks 34 until the weld between the anti-vibration bar end caps 30 and the retaining ring 27 is cured. The discretely sized spacers allow a very small gap between the flow tubes 25 and the two adjacent anti-vibration bars 28 which will prevent compressive forces on the tubes 25 at operating temperatures while mitigating vibrations. The selection of the appropriate spacer blocks is currently performed by manually inserting a spacer, measuring the resulting gap with various feeler gauges and if an acceptable gap has been found, the clamp is held in place while the anti-vibration bar end cap 30 is welded to the retaining ring 27. This is a laborious process. The embodiment described herein provides an automated anti-vibration bar clamping tool that enhances the efficiency of the process and provides a repeatable, consistent result.

Figure 4:
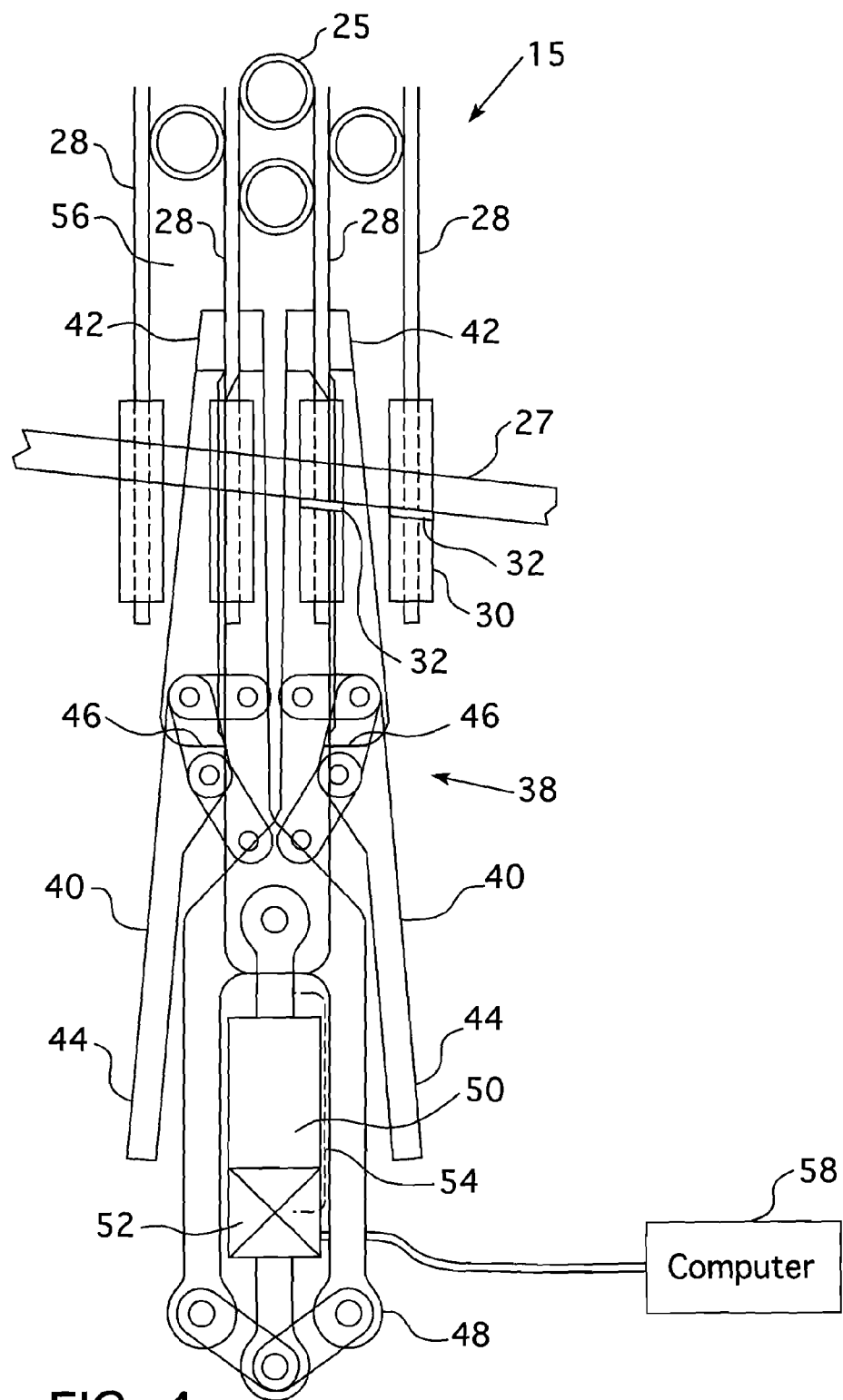
FIG. 4 is a schematic partial plan view of FIG. 3 that shows the tool of the preferred embodiment described herein applied to positioning several of the anti-vibration bars respectively in the lanes between the flow tube columns.

The embodiment described herein is illustrated in FIG. 4, which provides a partial plan view of the tube bundle 15, showing three partial columns of tubes 25 bordered on two sides in the adjacent tube lanes by vibration bars 28. The embodiment shown in FIG. 4 employs an automated tool 38 to position the anti-vibration bars 28 relative to the tubes 25, prior to welding to the retaining rings 27. The tool comprises two clamp elements 40 having jaws 42 at one distal end which close against and secure adjacent anti-vibration bars when the actuation arms 44, corresponding to the respective jaws 42, are drawn towards each other. Preferably, one of the jaws 42 is secured on an anti-vibration bar 28 whose end cap 30 has already been affixed to the retaining ring 27 via a weld 32. Desirably, the actuation arms 44 are connected to the jaws 42 through a toggle linkage 46 that transitions the jaws 42 between an open and locked condition. The jaws are attached to a scissor assembly 48 which is actuated by a linear drive motor 50 in line with a force gauge 52 (or load cell) for determining the force applied by the motor. A distance measuring device 54, such as a linear variable differential transducer (LVDT), is mounted in parallel with the linear drive motor 50. Alternately, the drive motor may have its own displacement readout.

Figure 5:
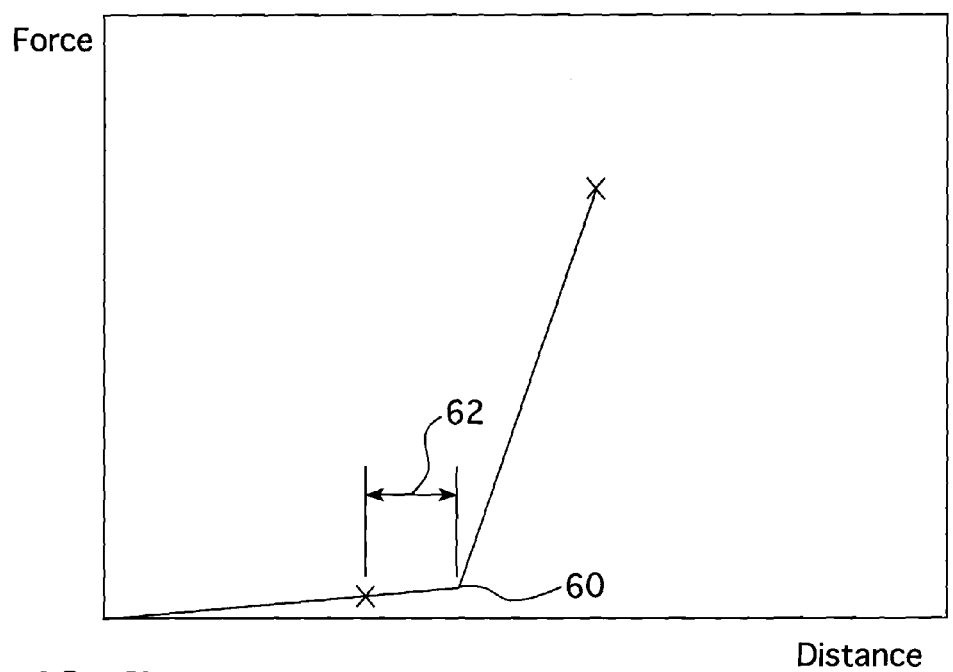
FIG. 5 is a graphical representation of an exemplary force/distance curve that illustrates the anti-vibration bar clamping load versus deflection that is sensed by the tool illustrated in FIG. 4.

The tool 38 is operated by first using the clamp elements 40 to clamp the scissor assembly 48 to two adjacent anti-vibration bars whose spacing is to be adjusted. The jaws 42 are positioned over or under the anti-vibration bars 28 to be clamped and the jaws 42 are closed on the respective anti-vibration bars by drawing the actuation arms 44 towards each other to toggle the linkage 46 to a closed position. A tapered spreader bar the length of several rows of tubes, may be inserted in the "unwelded" column 56 to ensure that only the tubes 25 affecting the gap that is being measured affect the readout. The linear drive motor 50 is cycled and readouts of force and distance are automatically read into a computer 58 which controls the linear drive motor, to determine the slope of the force/distance curve and from a change in that slope, the point of contact between the anti-vibration bar and the flow tubes 25. An example of such a curve, showing the anti-vibration bar clamping load versus deflection, is illustrated in FIG. 5 with the deflection distance shown on the X axis and the load force shown on the Y axis. Contact between the anti-vibration bar and the tubes occur where the curve takes a marked change in slope at the coordinate 60. The desired gap is located in a narrow range of coordinates 62, just prior to the point at which the change in slope occurs. The computer automatically cycles the drive motor 50 to adjust the gap between the anti-vibration bar 28 and the tube 25 to the desired value, e.g., within the range 62, prior to welding of the retaining ring 27 to the anti-vibration bar end cap 30. After welding and cooling of the anti-vibration bar, the motor 50 is cycled to determine the final gap, by determining the position at which no load occurs in the scissor assembly 48. The computer then records the final gap and anti-vibration bar location.

Thus, the automated anti-vibration clamping tool and method of this embodiment provides motor driven spacing elements which vary the distance between adjacent anti-vibration bars and a force gauge measurement of the resulting clamping force between anti-vibration bars, with limits to assure no anti-vibration bar or tube damage occurs. Programmed movement of the clamps to determine the spacing distance at which incipient contact occurs between the two adjacent anti-vibration bars and the outer most tubes assures consistent results that are repeatable. Furthermore, programmed movement of the clamps to set the desired spacing between the tubes and anti-vibration bars assures the repeatability and consistency of the process. Additionally, recording of the spacing prior to welding between the flow tubes and the anti-vibration bars by column and anti-vibration bar position number and recording the spacing after welding by column and anti-vibration bar position number assures accurate manufacturing records that will facilitate later servicing of the generator.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of installing anti-vibration bars in the U-shaped bend of a tube bundle of a U-tube heat exchanger, wherein the tube bundle has a plurality of rows of tubes, arranged in columns, with tube lanes therebetween, the method comprising the steps of:
    connecting two clamps that are hinged together at a scissor joint, respectively to two adjacent anti-vibration bars positioned respectively in the U-bend in the tube lanes of two adjacent columns of tubes of the tube bundle, the clamps each having an actuation arm upstream of the scissor joint, with the clamps, actuation arms and scissor joint forming a scissor assembly;
    operating a linear drive motor connected to the scissor assembly to adjust the distance between the clamps, and thus the distance between the two adjacent anti-vibration bars to alter the spacing between the anti-vibration bars and the column of tubes between the two adjacent anti-vibration bars; and
    welding end portions of the anti-vibration bars to a corresponding retaining ring encircling a periphery of a curved portion of the U-shaped bend of the tube bundle.

2. The method of claim 1 including the step of controlling the force exerted by the linear drive motor on the two adjacent anti-vibration bars with a computer.

3. The method of claim 2 wherein the computer records the spacing between the anti-vibration bars and the column of tubing therebetween prior to welding by column and anti-vibration bar number.

4. The method of claim 2 wherein the computer records the spacing between the anti-vibration bars and the column of tubing therebetween after welding by column and anti-vibration bar number.

5. The method of claim 2 wherein the linear drive motor includes a displacement and a force measuring device.

6. The method of claim 5 including the step of cycling the linear drive motor and outputs of force and distance are read into the computer to determine the slope of a force/distance curve.

7. The method of claim 6 wherein the computer determines a point of contact between the anti-vibration bars and the tubes therebetween.

8. The method of claim 7 wherein after determining the point of contact the computer cycles the linear drive motor to adjust a gap between the anti-vibration bars and the tubes to a preselected gap prior to welding of the anti-vibration bar to the retaining ring.

9. The method of claim 8 wherein after welding and cooling of the anti-vibration bar the linear drive motor is cycled to determine the final gap between the adjacent anti-vibration bars by determining the position at which no load occurs in the scissor assembly.

10. The method of claim 5 wherein the displacement measuring device is a linear variable differential transformer.

11. The method of claim 5 wherein the force measuring device is a load cell.

12. The method of claim 1 wherein the clamps are each toggle clamps.

* * * * *